(12) United States Patent
Sklyarevich et al.

(10) Patent No.: US 11,292,161 B1
(45) Date of Patent: Apr. 5, 2022

(54) METHOD OF COMPACTING AIRBAG CUSHIONS

(71) Applicant: Gyrotron Technology, Inc., Bensalem, PA (US)

(72) Inventors: Vladislav Sklyarevich, Bensalem, PA (US); Mykhaylo Shevelev, Huntington Valley, PA (US)

(73) Assignee: GYROTRON TECHNOLOGY, INC., Bensalem, PA (US)

( * ) Notice: Subject to any disclaimer, the term of this patent is extended or adjusted under 35 U.S.C. 154(b) by 0 days.

(21) Appl. No.: 17/411,104

(22) Filed: Aug. 25, 2021

Related U.S. Application Data

(60) Provisional application No. 63/225,989, filed on Jul. 27, 2021.

(51) Int. Cl.
*B29C 35/08* (2006.01)
*B01J 19/12* (2006.01)
*B29D 99/00* (2010.01)

(52) U.S. Cl.
CPC ......... *B29C 35/0888* (2013.01); *B01J 19/126* (2013.01); *B29C 2035/0855* (2013.01); *B29D 99/0092* (2013.01)

(58) Field of Classification Search
None
See application file for complete search history.

(56) References Cited

FOREIGN PATENT DOCUMENTS

CN          112659444 A    *  4/2021

* cited by examiner

*Primary Examiner* — Robert J Grun
(74) *Attorney, Agent, or Firm* — Carothers and Carothers

(57) ABSTRACT

A method of thermal compacting of an airbag cushion is described where rapid heating is conducted by a microwave beam directed at a mold through a radiation transparent wall without materially heating the mold itself.

13 Claims, 3 Drawing Sheets

METHOD OF COMPACTING AIRBAG CUSHIONS

BACKGROUND OF THE INVENTION

Field of the Invention

This invention relates to forming polymer articles preferably containing cushion materials. Different solid polymers such as woven nylon fabric, polyester and the like can be thermally treated by the inventive method. Articles manufactured by this method can be used in the production of airbags, plastic containers, sole structures, and the like.

This invention further relates generally to inflatable vehicular safety restraints such as airbag installations for automotive vehicles and, more particularly, to inflatable vehicular safety restraint assemblies such as particularly suited in or for the protection of a seated vehicle occupant in the event of the occurrence of a side impact or a head-on collision.

Discussion of Related Art

It is now a legal requirement for new vehicles to have airbags. They are typically installed in the steering wheel, in the dashboard on the passenger side of a car, and many other places, and even on the outside parts of the car body. Many hundreds of millions of airbags are manufactured each year to satisfy over 90 million vehicles that are produced annually.

Airbag production usually involves a forming stage. This includes folding airbag material as compact as possible and pressing it in a mold, moisturizing it, heating/drying it to around of 140 degree Celsius, and then cooling and removing it from the mold. After the forming stage the airbag retains its compact folded shape. This forming stage is the most time consuming because the material is heated inside the mold and heating, as well as cooling, is conducted through the mold by thermal conductivity (see for example U.S. Pat. Nos. 6,539,612, 7,063,350, 9,981,628, 10,286,870, 10,328,891 and others) by hot air, gas, or infrared. This takes many dozens of minutes and even hours due to usual low thermal conductivity of airbag fabrics. The cooling process takes even longer.

Heating/drying time can be reduced by placing a heater inside the mold or material itself (see for example U.S. Pat. Nos. 6,539,612, 7,549,271, 10,071,704) or by using a vacuum (see for example U.S. Pat. Nos. 8,806,773 and 10,471,921). However, the forming stage in these inventions is still a longer process for the same reason: main heating is still conducted through low thermal conductive material (from the molds to the cushions). In the case of using a vacuum as described in the U.S. Pat. Nos. 8,806,773 and 10,471,921, the cushion, and especially the mold, need to be heated to a higher temperature in order to compensate for the cooling effect of evaporation. Moreover, in vacuum, the thermal conductivity is even lower and using traditional heating takes more time to heat airbag material more or less uniformly. For all the methods described in the above mentioned patents, the molds/containers need to be hot and cooling them takes a long time.

Thus for such an extremely large number of airbags that are made each year, the production time and energy consumption are enormous. The main reason, long heating and cooling times are required is because of the low thermal conductivity of the polymer based materials and cushion material. Changing these properties would require significant change in material chemistry that would make it virtually worthless for airbag production Accordingly, there is a clear need in the art for a more effective and less expensive method to "thermofix" the pre-folded airbag cushions.

SUMMARY OF INVENTION

A general object of the invention is to improve the method of manufacturing an airbag cushion, more specifically to accelerate the thermal forming of a cushion article that is deposited, compressed, and moistened in a hard demountable mold.

In the invention, a method of rapid thermally forming a compressed cushion article is described where heating of the article to around the boiling point of water is provided under normal pressure by a divergent microwave radiation beam, directed through at least one portion of the mold wall that is made of microwave transparent material, and where the beam is formed to about the shape of the mold portion or scanned over it; and wherein the frequency of said radiation is selected to provide penetration depth of said radiation for substantially volumetric heating of the compressed article; further heating is provided by said beam, while under low vacuum, until the compressed article is completely dried and will substantially retain a prearranged shape after cooling and removal from the mold.

The microwave transparent materials are selected from quartz, Teflon, nitride ceramic, and the like. These materials are sufficiently rigid and do not interact with microwaves. i.e. they stay cold (are not heated) when microwave passes through.

The microwave radiation frequency is selected to be between about 28 GHz to about 100 GHz. Such microwaves rapidly heat most materials that are used in the production of airbags, plastic containers, sole structures, and the like. There are a group of microwave beam sources that are available for use, consisting of a gyrotron, klystron, traveling-wave tube and the like;

It is further preferred to use molds made of materials that either reflect or transmit such microwave radiation frequency, i.e. metal, quartz, Teflon, and the like. In this case the mold will be guaranteed not to be heated with microwaves.

It is further preferred to line the mold inside, at least partially, with a microwave transparent material to provide a better approach of the microwave radiation to the sides and bottom of the article. To maintain minimal losses of the microwave energy, the thickness of the liner is preferred to be about a multiple of half of the radiation wavelength in use.

The heating time can be further reduced if the power density profile generated by microwave beam is correspondent to the shape profile of the article. In this case the thicker areas will be heated by a higher power density and vice versa thereby excluding unnecessary time for the heat to equalize over the article.

It is further preferred that the article is moistened shortly before creating a low vacuum, to reduce the long evaporation time.

In another aspect or embodiment of the invention, the article is provided with at least one additional layer such as metal, ceramics, rubber, polar polymers, plastics, organics, and the like that is adjacent to the article from the side opposite to the mold wall portion, and each layer of the article is heated to its predetermined temperature range to form a composite article.

DETAILED DESCRIPTION OF THE INVENTION

A general object of the invention is to improve the method of manufacturing airbag cushions, and more specifically, to accelerate thermally forming of a cushion article.

Figure 1:
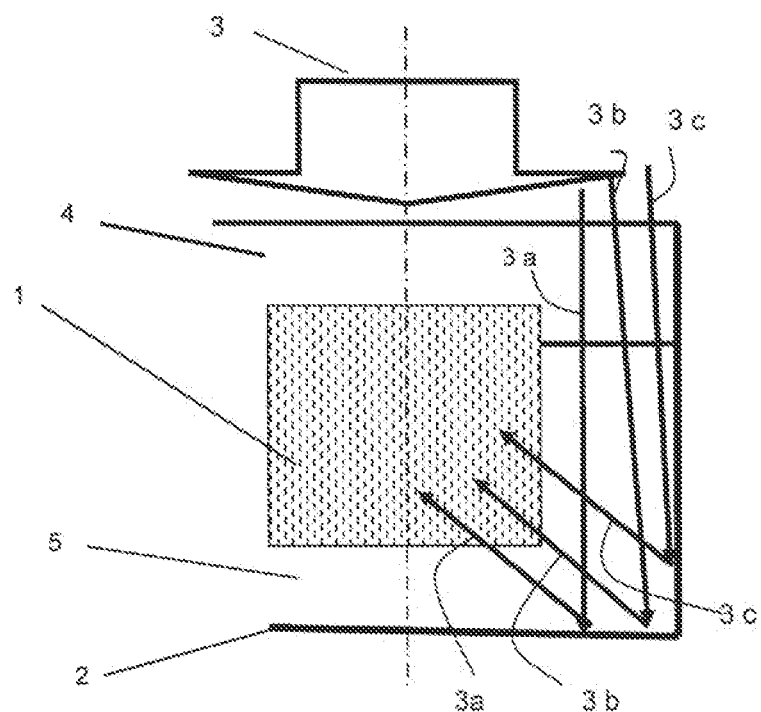
FIG. 1 is a schematic view showing an airbag cushion inside a mold heated by a microwave beam in accordance with the invention.
Figure 2:
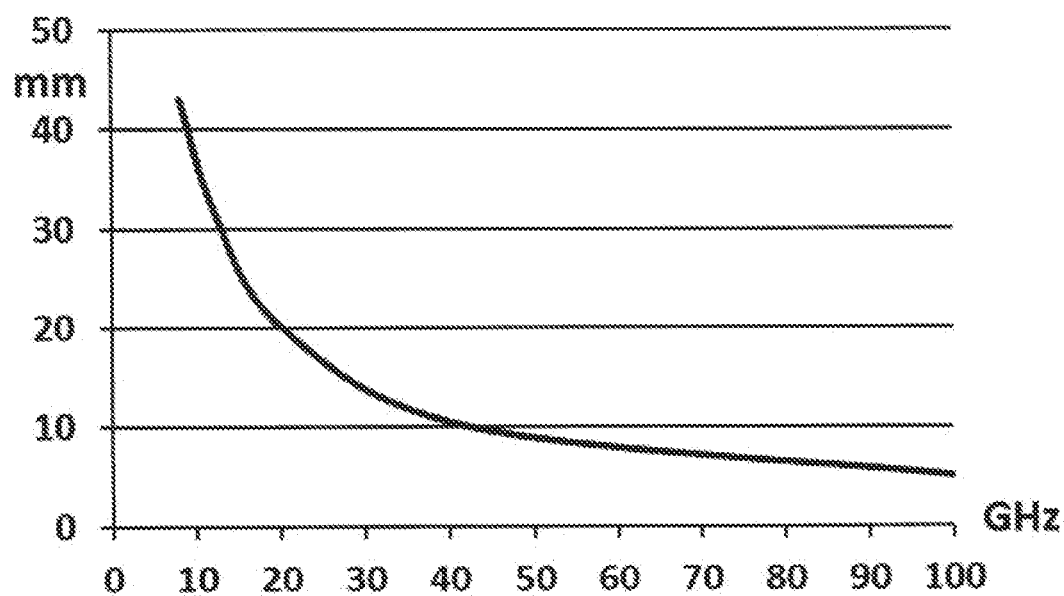
FIG. 2 is a graph showing the dependency of penetration depth in nylon vs. radiation frequency.

In the invention the heating of the compressed cushion article (1, FIG. 1) placed in the mold (2) to around the boiling point of water is accomplished under normal pressure by a divergent microwave radiation beam (3), through at least one portion of the mold wall (4) that is made of microwave transparent material such as Teflon, quartz, nitride ceramics, and like. Further heating is provided under low vacuum by the beam until the compressed article is completely dried and the prearranged shape is retained after cooling and removal from the mold.

In the invention the approach of the microwave radiation to the side and bottom of the article (3,a; 3.b; and 3c) is improved through the at least partial lining (5) inside the mold. This promotes better uniformity of the article heating which means higher microwave power can be applied and faster heating can be provided. It is proposed to select the material for lining from the same group as selected for the microwave transparent portion of the mold wall (4).

For the same reasons, the power density profile generated by microwave beam is selected to form a shape correspondent to the shape profile of the article. This approach allows achievement of additional savings in heating time to provide the heating of the thicker areas by higher power density and vice versa. This excludes unnecessary time for the heat to equalize over the article. In one embodiment of the invention the described heating profile is achieved by scanning the beam over the transparent mold wall It is further preferred to select the thickness of the liner to be about a multiple of half or more of the radiation beam wavelength used in the liner material. In this case the losses of the microwave energy is minima).

Figure 3A:
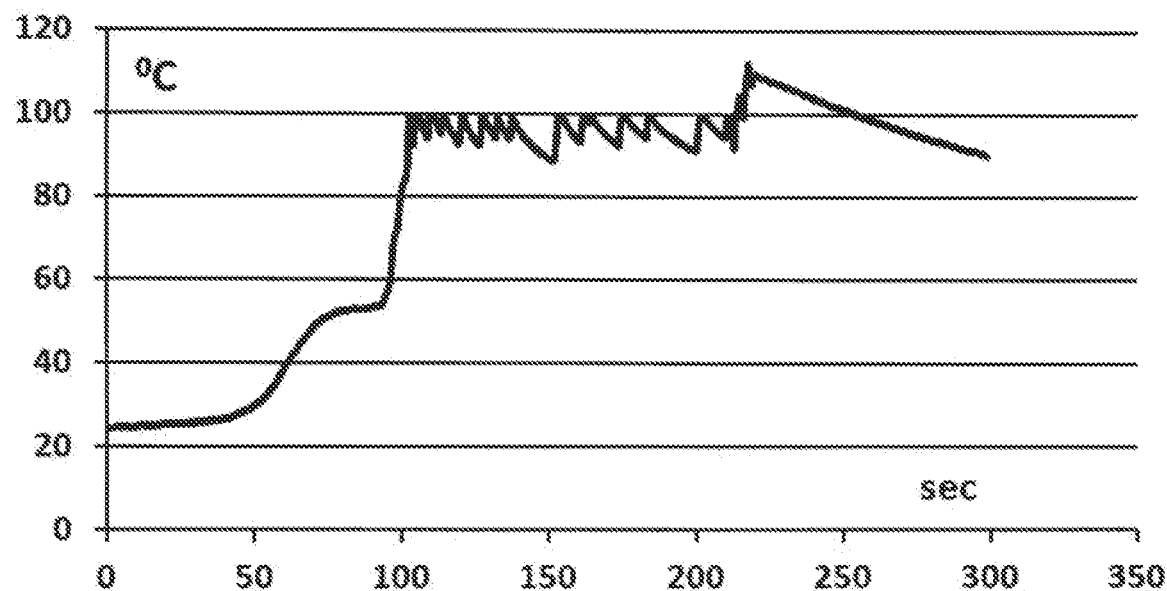
FIG. 3a. is a graph showing the diagram of the heating of the article at normal pressure.
Figure 3B:
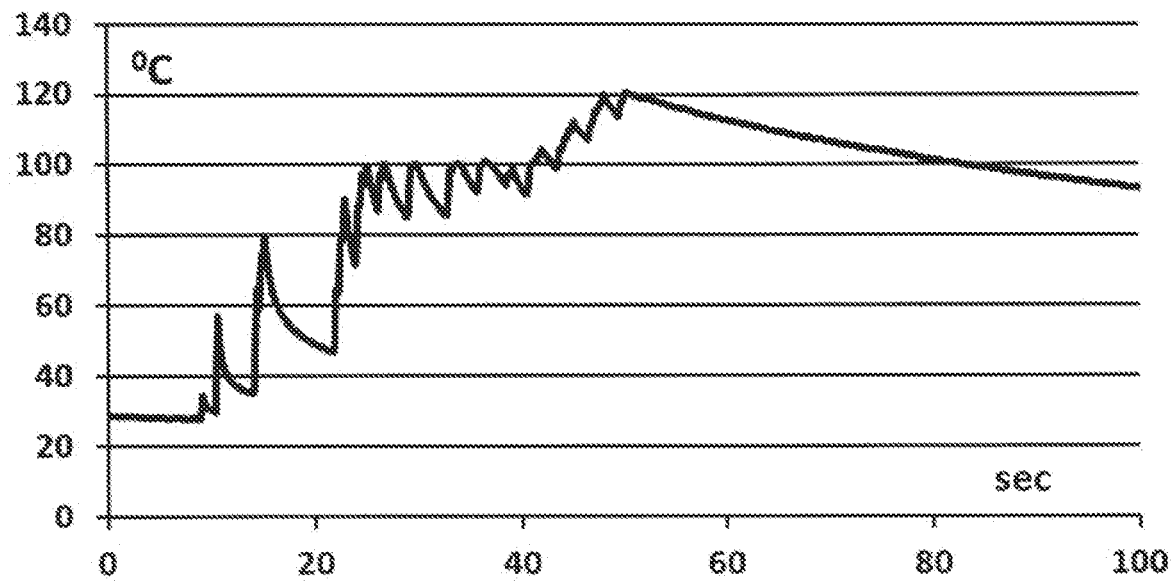
FIG. 3b. is a graph showing the diagram of the heating of the article at low vacuum.
Figure 4:
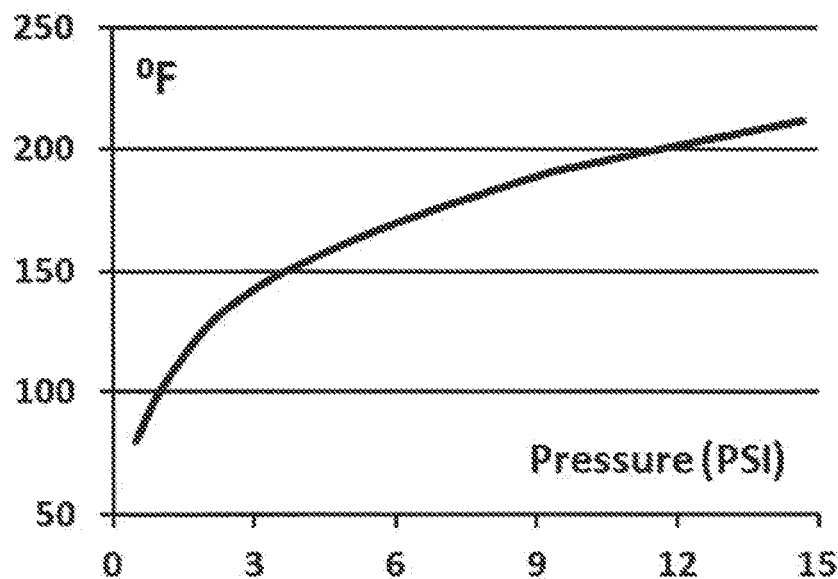
FIG. 4 is a graph showing the dependency of the water boiling point temperature as a function of pressure.

In the inventive method the heating is conducted under normal pressure at the beginning until the article temperature of around the boiling point of water is achieved. Because the article is a compressed multilayer structure, the evaporation of the water/moisture from the cushion is obstructed and takes a much longer time than heating itself does (see FIG. 3a). Therefore further heating is preferred under low vacuum allowing significant reduction of the processing time (see FIG. 3b). The low pressure that surrounds the article helps the steam with air to be extracted from the article. However the low pressure reduces the boiling point of water and hence the cushion temperature is also reduces due to evaporating (see FIG. 4.) This has a negative effect on the forming of the article because it should be hot until it is completely dried. Volumetric microwave heating of the article is not affected by the low vacuum. The continuation of the microwave heating during the evaporation under low vacuum permits maintaining the article hot enough until it is dry. The article will substantially retain the prearranged shape after cooling and removal from the mold.

The present invention provides the opportunity to moisten the article at any appropriate moment during the heating inside the mold by using correspondent means incorporated in the mold. It is possible, because the article is heated directly in the mold, that the metal or microwave transparent mold remains cold. This makes the processing time shorter by avoiding screening the article from microwave. Water has a higher absorption of microwave than any article material. Cooling time of the production cycle is reduced by cooling the article directly inside the mold. The provided or separate means can be used for cooling.

Heating the article directly in the mold by microwave does not require heating the mold itself and significantly reduces the cooling time.

In one embodiment of the present invention the mold is made of materials that reflect or transmit microwave radiation, for example, metal, quartz, Teflon, and the like and therefore the mold stays practically cold during entire forming process. This is significantly reduces the forming time.

Further reduction of processing time is realized if the power density profile generated by the beam is formed to be correspondent to the profile of the article thicknesses. This provides irradiation of the thicker areas of the article with more power to heat faster. This also increases efficiency of the microwave beam heating.

The present invention also provides the opportunity to form a composite article that has at least one more additional layer such as ceramics, rubber, polar polymers, plastics, organics, and the like. This additional layer is adjacent to the article from the side opposite to the mold wall transparent portion and each layer of the article is heated fast and is controllably to its predetermined temperature range by selection of the beam wavelength to provide penetration depth of the radiation greater than the thickness of the article portion that is on the top of the additional layer. At that, the wavelength selection provides appropriate absorption of the beam energy in each portion of the article to thereby heat them to predetermined temperatures.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

EXAMPLES

The following examples are presented to provide a more detailed explanation of the present invention and of the preferred embodiments thereof and are intended as illustrations and not limitations.

Nylon fabric having surface density of 560 grams per square meter was chosen for the heating experiments. Three identical pieces of fabric, 100 gram each, were sprayed with 3 grams of water each, then each was identically folded to form a multilayer pack and placed (pressed) into a cylindrical metal mold with Teflon covering the top. Thickness of the pressed fabric was 7 mm. The temperatures inside the fabric pack was measured by a K-type thermocouple placed inside each pack and recorded by a data logger. There were three experiments:

Experiment 1. Heating was conducted by a 60 GHz gyrotron beam in a metal shield chamber under normal pressure. The beam was scanned over a Teflon cover. The irradiation (heating) was conducted until water was completely evaporated (until recorded temperature inside the package started to raise over 100° C., see FIG. 3a).

Experiment 2. Heating was conducted in a vacuum chamber with a microwave transparent wall. The vacuum chamber was placed in the mentioned microwave chamber. The heating to 100° C. was conducted under normal pressure (as in experiment #1) and further heating was conducted under low vacuum (100 mBr absolute pressure). The boiling point of water for the selected vacuum level is less than 50° C. Heating was stopped when recorded temperature was over 100° C. and it was witnessed that the fabric was completely dried (see FIG. 3b)

Figure 3C:
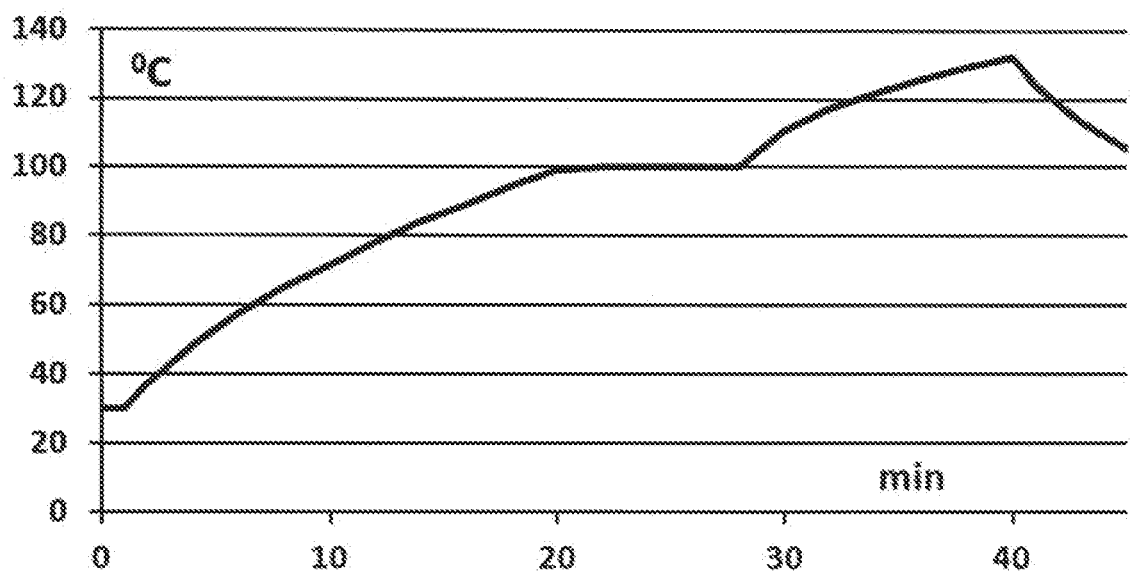
FIG. 3c. is a graph showing the diagram of the heating of the article in a regular air convection oven under normal pressure.

Experiment 3. Heating was conducted in a regular air convection oven under normal pressure. Air temperature was 160 degree Celsius. Heating was conducted until water was completely evaporated (until recorded temperature inside the package started to raise over 100° C., see FIG. 3c).

The foregoing examples illustrates that the invention heating method allows extreme acceleration for thermally forming a compressed cushion article in the production of airbags, plastic containers, sole structures, and the like.

What is claimed is:

1. A method of rapid thermally forming a compressed cushion article deposited in a demountable mold, and moistened, including; heating the article to around the boiling point of water under normal pressure by a divergent microwave radiation beam, directed through at last one portion of the mold, which portion is made of microwave transparent material, and wherein the beam is formed to about the shape of sail mold portion or scanned over said mold portion, and wherein the frequency of sail radiation is selected to provide penetration depth of sail beam for substantially volumetric heating of the compressed article, and further heating said article by sail beam, while under vacuum, until the compressed article is completely dried and will substantially retain a prearranged shape after cooling and removal from the mold.

2. The method of claim 1 wherein the microwave transparent materials are selected from quartz, Teflon and nitride ceramic.

3. The method of claim 1 wherein the microwave radiation frequency is selected to be between about 28 GHz to about 100 GHz.

4. The method of claim 3, wherein the microwave beam source is selected from the group consisting of gyrotron, klystron, and traveling-wave tube.

5. The method of claim 1 wherein said mold is also ide of materials that reflect or transmit sail microwave radiation.

6. The method of claim 5, wherein said mold is made of metal, quartz or Teflon.

7. The method of claim 1, wherein said mold is at least partially lined inside by a microwave transparent material liner.

8. The method of claim 7, wherein the thickness of said liner is selected to be a multiple of about half of the radiation wavelength used in the liner material.

9. The method of claim 1, wherein the power density profile generated by the microwave beam is correspondent to the shape profile of the article.

10. The method of claim 1, wherein said article is provided with at least one additional layer selected from ceramics, rubber, polar polymers, plastics and organics, and is positioned adjacent to said article on the side opposite to the microwave transparent mold wall portion and each layer of said article is heated to its predetermined temperature range to form a composite article.

11. The method of claim 1, wherein at least one means is incorporated in said mold body to provide moistening and/or cooling of the article.

12. The method of claim 11, wherein article is moistened during heating.

13. The method of claim 11 wherein sail article is moistened shortly before creating a low vacuum.

* * * * *